United States Patent [19]
Li et al.

[11] Patent Number: 5,572,609
[45] Date of Patent: Nov. 5, 1996

[54] OPTICAL FIBER VIBRATION MODAL FILTER FOR FLEXIBLE STRUCTURES PRODUCED BY THE PHOTOREFRACTIVE EFFECT

[75] Inventors: Yaowen Li, Hyattsville; James S. Sirkis, Burtonsville, both of Md.

[73] Assignee: University of Maryland, College Park, Md.

[21] Appl. No.: 523,529

[22] Filed: Sep. 1, 1995

[51] Int. Cl.$^6$ ........................................ G02B 6/00
[52] U.S. Cl. ............................................ 385/12
[58] Field of Search ............................ 385/12–14

[56] References Cited

U.S. PATENT DOCUMENTS

| | | | |
|---|---|---|---|
| 5,208,877 | 5/1993 | Murphy et al. | 385/12 |
| 5,224,182 | 6/1993 | Murphy et al. | 385/12 |
| 5,384,884 | 1/1995 | Kashyap et al. | |

OTHER PUBLICATIONS

Hill et al. "Photo–sensitivity in optical fiber" Annu. Rev. Mater. Sci. 125 (1993) pp. 125–57.
Atkins et al., "Photolytic Index Changes in Optical Fibers," Ann. Rev. Mater. Sci. (1993) pp. 381–407.
Malo et al., "Effective index drift from molecular hydrogen diffusion in hydrogen–loaded optical fibres and its effect on Bragg Grating fabrication" Elect. Ltrs. (1994) pp. 442–443.

*Primary Examiner*—Akm E. Ullah
*Attorney, Agent, or Firm*—Christopher N. Sears

[57] ABSTRACT

The invention herein provides a method and apparatus for fabricating optical fiber vibration modal filtering sensors. Such filtering sensors are used in vibration control of engineered structures, especially flexible structures. In particular, the optical fiber sensor is made by a functionally weighted exposure of an optical fiber to ultra-violet (UV) laser source thereby modifying the refractive index of the optical fiber core resulting in a vibrational modal filtering sensor using a single mode interferometric detection scheme. The apparatus for making the same uses a multiple reel stepper motor mechanism, a process controller and a UV laser source.

9 Claims, 9 Drawing Sheets

OPTICAL FIBER VIBRATION MODAL FILTER FOR FLEXIBLE STRUCTURES PRODUCED BY THE PHOTOREFRACTIVE EFFECT

FIELD OF THE INVENTION

This invention pertains to optical fiber vibration filtering sensor and method for making the same for use in mechanical structures. In particular, the invention is an optical fiber based vibration filtering sensor produced by the photoreactive effect of the optical fiber's core to effect direct distributed changes along the length of the fiber, thus creating a refractive index profile in the fiber's core of the vibration filtering sensor.

BACKGROUND OF THE INVENTION

Optical fiber based modal filtering sensors are suitable for overcoming observer spillover which is a phenomenon that a filtering sensor's output contains. Theoretically, any structure has an infinite number of vibration modes, but in vibration control, only a finite number of modes will be incorporated in the control algorithm. An observer is used in the control algorithm to obtain full states (parameters of the controlled modes) required by feedback when only partial states can be obtained from sensor outputs. This observer spillover contains the uncontrolled mode information which influences the observer and makes the controller unstable. Filtering sensors are used in conjunction with control algorithms for minimizing undesirable mechanical vibrations in flexible structures. When designing these vibration control algorithms, it has been discovered that a spatially distributed type sensor can detect information of all vibration modes of a structure that is experiencing full spectrum vibration and retain controlled modes and filter any uncontrolled modes present in the structure.

The theoretical basis of vibration modal filtering sensors taught by the prior art and used by the invention herein comes from propagation properties of light in weakly-guided optical fibers and the theory of fiber-optic interferometric sensors. As an example of such a sensor, a dual-mode fiber-optic sensor can be expressed by the phase difference ($\Delta\phi_0$) between the two propagating bees within an optical fiber as follows:

$$\Delta\phi = \Delta\phi_0 + \int [\Delta\beta(x) \cdot \epsilon(x,t)] \delta x \text{ for } x \text{ between } L^- \text{ and } L^+ \quad (1)$$

where $\Delta\phi_0$ is a constant for a given sensor, $L^-$ and $L^+$ are the starting and ending positions of the sensor, $\Delta\beta(x)$ is the difference of the propagation constants of the beams and is called the "weighting function", $x$ is the coordinate along the fiber sensor and $\epsilon(x,t)$ is the strain applied to the fiber-optic sensor. The term $\epsilon(x,t)$ contains the information of various vibrating modes, and can usually be expressed as $\epsilon(x,t) = \Sigma Y_{i''}(x)\eta_i(t)$ for $i$ equal to zero to infinity, where $Y_{i''}(x)$ is related to the mode shape and $\eta_i(t)$ is known as the modal coordinate. If $\Delta\beta(x)$ is designed such that $\Delta\beta(x)$ and $Y_i(x)$ meet orthogonality conditions, only the $i^{th}$ mode information is retained in the sensor output, thus yielding a vibration modal filter. From the above analysis, this propagation constant, $\Delta\beta(x)$ has to be varied along the length of the fiber sensor and "programmed" therein.

The governing equations for light propagating in a weakly guided optical fiber are as follows:

$$[uJ_{l\pm1}(u)]/[J_l(u)] = [\gamma K_{l\pm1}(\gamma)]/[K_l(\gamma)] \text{ where } l=0,1, \quad (2)$$

and $$u^2 + \gamma^2 = V^2 \quad (3)$$

where
$u^2 = (n_o^2 k_o^2 - \beta^2) a^2$;
$\gamma^2 = (\beta^2 - n_c^2 k_o^2) a^2$
$k_o = 2\pi/\lambda_o$ and $\lambda_o$ is the light's wavelength in free space;
$a$ is the core radius and $\beta$ is the propagation constant;
$n_c$ and $n_o$ are the refractive indices of the cladding and core respectively;
$V = k_o[\sqrt{(n_o^2 - n_c^2)}]$ is known as the normalized frequency.

If V can be varied along the sensing fiber length, then $u$, $\gamma$ and $\beta$ from Eqs. (2) and (3) are functions of the coordinate along the sensing fiber length. Further, if $\beta$ can be a varied along the sensing fiber length, the expected $\Delta\beta(x)$ in equ. (1) can be obtained by designing the normalized frequency V number along the sensing fiber length.

U.S. Pat. No. 5,224,182 entitled "Spatially-Weighted Two-Mode Optical Fiber Sensors" by Murphy et al. teaches of varying the fiber core diameter by a tapering method as a way of obtaining a modal filtering sensor. This teaching uses a fiber drawing tower to fabricate optical fiber sensors with known taper profiles by controlling the furnace temperature, the preform-feed speed and the fiber-pull speed. This method can also taper the fiber by using a coupler station. The basis of its' operation is the difference of the propagation constants of the two modes in a two-mode fiber and can use a weighting function for vibration filtering if it varies along the fiber length. Limitations of this type method of producing a modal filter include i) the fabrication thereof is difficult due to the small change of the fiber core diameter; ii) the complexity of the expected weighting functions; and iii) the degradation to fiber strength due to diameter change.

U.S. Pat. No. 5,208,877 by Murphy et al. entitled "Fiber Optic Grating-Based Weighted, Two-Mode Fiber Sensors" teaches of a two-mode optical fiber sensor with a permanent photo-induced index of refraction core change that can be used for modal distributed vibrational filtering applications using a Hill-like grating method. In particular, this teaching obtains a fiber-optic vibration mode filter for a cantilever beam by writing a Hill-like grating in a germanium-doped dual-mode optical fiber. The gratings occurred only at those locations where the two supported optical modes interfere with each other. These locations periodically position down the fiber length and are dependent on the strain in the fiber when light at the same wavelength used for writing the gratings at 488 nm is coupled into the fiber. The mode filter reflects all the light when the strain in the fiber matches the strain during the writing condition. The power transmitted by the fiber increases non-linearly as the strain gets further from the writing condition. To retain the first mode of the filtering and filter other mode information of a structure, for example using a cantilever beam in the sensor output, this teaching uses a Hill-like grating at the same time when the sensing fiber was prestrained in the shape of the first mode, and the linear region of the strain-power curve is used for performing sensor measurements. Limitations of this method of producing such a filtering sensor include: i) harmonic distortion caused by nonlinear behavior of the strain-power response; ii) theoretical models used for producing the same are very complex and not yet available; iii) the filtering sensor must be prestrained to the mode shape that is to be retained; iv) the grating writing process is based on interferometry which dictates stringent control over environmental disturbances during making of the filter; v) the wavelength of 488 nm used to write the gratings is far from the optimal wavelength of 244 nm; and vi) the filter must be interrogated using the same wavelength used to produce the gratings wherein this constraint is significant since argon-ion lasers used in the production of this filter are large and expensive, making their use in interrogating these Hill-like grating based modal filters impractical for field applications.

To overcome limitations of the above, the invention herein directly changes the refractive index profile of the optical fiber core for a single-mode interferometric based filtering device.

SUMMARY OF THE INVENTION

The invention herein provides a method and apparatus for fabricating optical fiber vibration modal filtering sensors. Such filtering sensors are used in vibration control of engineered structures, especially flexible structures. In particular, the optical fiber sensor is made by a functionally weighted exposure of an optical fiber to ultra-violet (UV) laser source thereby modifying the refractive index of the optical fiber core resulting in a vibrational modal filtering sensor using a single mode interferometric detection scheme. The apparatus for making the same uses a multiple reel stepper motor mechanism, a process controller and a UV laser source.

The sensor is fabricated by a refractive index profile method using the photorefractive effect of germanium-doped optical fibers. The vibration mode filters are obtained by directly illuminating the germanium-doped fiber with an intense UV source; typically an excimer laser with a wavelength of 248 nm or a frequency-doubled argon-ion laser with wavelength of 244 nm, and controlling the laser power and the translation speed of the fiber's illumination. Control of the illumination time enables one to produce a precise change of the refractive index in the fiber's core, which in turn, allows direct control of the weighting functions for producing the filtering sensor. The functional basis of this filtering sensor is efficient and similar to that used in tapered method discussed above. Instead of tapering the fiber to obtain the weighting function, the invention herein changes the refractive index of the fiber core using a direct writing approach to obtain a refractive index profile which meets the needs of expected weighting functions. The filtering sensor's strength is maintained while meeting the optical fiber's wavelength cutoff conditions. The strain-power response of the present invention is linear, no special stability requirements exist, the filtering sensor system can use well-known demodulation concepts, and inexpensive diode light sources can be used for interrogating the filtering sensor.

DETAILED DESCRIPTION

The invention herein maintains the orthogonality conditions imposed by vibration modal selection functions as discussed above by the equ. (1) using an optical fiber sensor that continuously modifies the propagation constant of the single mode supported by the optical fiber filtering element. To accomplish this, the optical fiber's core refractive index is changed by exposing the core region of a germanium doped fiber to high energy UV light, which takes advantage of the photorefractive effect to modify the refractive index. Other types of germanium doped fibers include elliptical core, standard single mode fibers and stress-induced high birefringent fibers.

Figure 3:
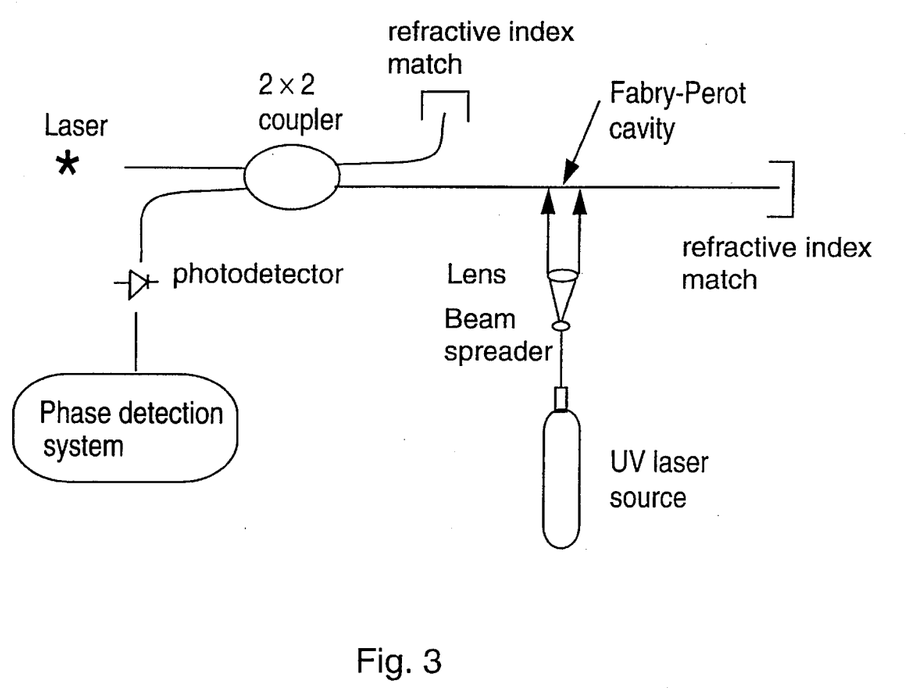
FIG. 3 shows an overview of one method using a Fabry-Perot cavity for determining actual experimental results the refractive index changes of the optical fiber used for the filtering sensor.

The refractive index of germanium-doped optical fibers can be modified permanently by exposing them to light at certain UV light. The wavelength of the UV source is around 230–270 nm for best conditions and the power should be sufficiently high to produce the desired refractive index change in a reasonable time period. This phenomenon is known as the photorefractive effect. The amount of index change depends on i) the composition of the glass, ii) the illuminating methods, iii) the wavelength and energy of the illuminating light, and iv) the time of exposure. The relationship between the illuminating time, the laser power and the refractive index change can be obtained by two methods as shown in either FIGS. 3 or 4 which show the schematic experimental arrangements for measuring the refractive index changes in the optical fiber used for the filtering sensor. In the intrinsic Fabry-Perot method of FIG. 3, the refractive index change caused by illuminating the germanium-doped fiber with UV light produces an optical path length difference change in the Fabry-Perot cavity. By monitoring the phase change as the UV light interacts with the fiber, the refractive index change can be obtained. The light intensity detected by a photodetector is as follows:

$$I = 1 - [\mu]\cos(\Delta\phi) \quad (4)$$

where I is the output intensity, $[\mu]$ is the visibility and $\Delta\phi = [4\pi/\lambda]\Delta nL$ with $\lambda$ the wavelength of the light used, L the cavity length, and $\Delta n$ the refractive index change caused by UV light illumination. Thus, after $\Delta\phi$ is measured using a phase detection system, the equation to calculate the refractive index change $\Delta n$ is:

$$\Delta n = [\lambda \Delta\phi]/[4\pi L] \quad (5)$$

Figure 4:
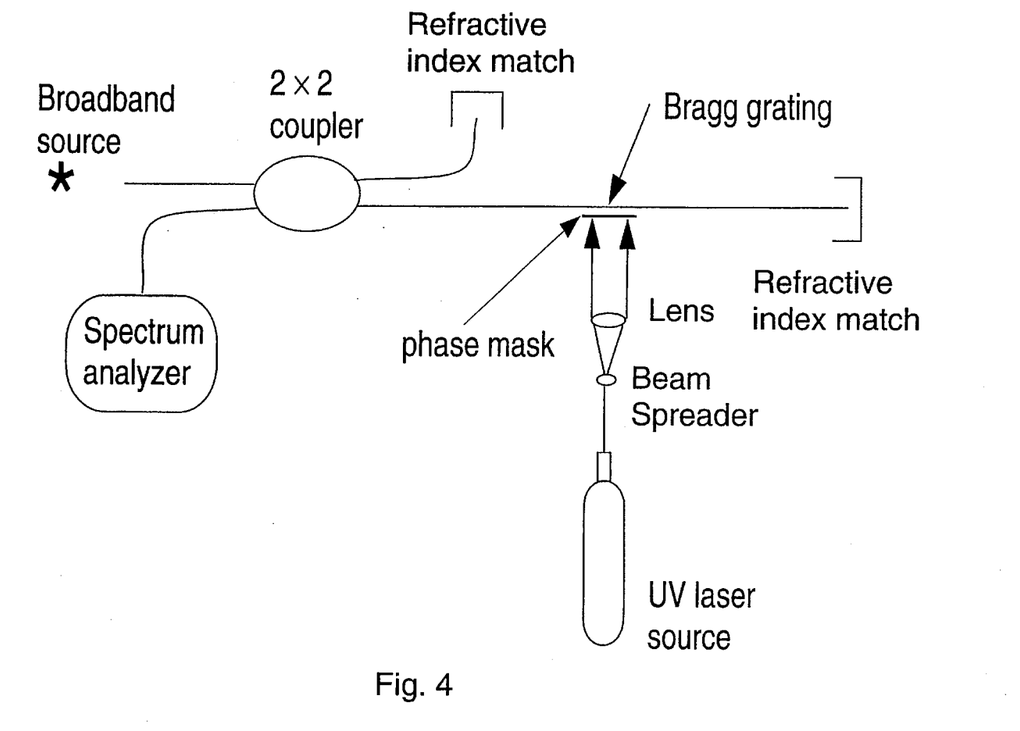
FIG. 4 shows an overview of another method using a Bragg grating for determining actual experimental results the refractive index changes of the optical fiber used for the filtering sensor.

The Bragg grating method shown in FIG. 4 determines Δn by measuring the reflectivity when writing a Bragg grating. The equation for calculating the peak refractive index change is as follows:

$$\Delta n = [\operatorname{arctanh}(\sqrt{R})\lambda b]/[\pi L \eta(V)] \quad (6)$$

where, R is the reflectivity, $\eta(V) \approx [1-1/V^2] \approx 0.8$ for $V \geq 2.4$ is the fraction of the integrated fundamental mode intensity in the core, L is the grating length and λb is the Bragg wavelength. As an example, this equation was used to measure the refractive index change in a hydrogen loaded germanium-doped fiber exposed to a 244 nm UV laser source with 190 mW nominal optical power. The grating was fabricated by expanding the laser beam to approximately 20 mm×3 mm and using a mask with 37% diffraction efficiency. A peak refractive index change of $10^{-5}$ can be obtained within 5 seconds. A laser not encompassing such a sizable area reduces the time required to change the fiber core's refractive index of $10^{-4}$ or higher occurs within 1 second.

Variable refractive index along the fiber length can be achieved by transversely illuminating a single-mode germanium-doped optical fiber with a 248 nm krypton-floride (KrF) excimer laser beam and controlling the illuminating time in each segment of the fiber. Other laser types that can be used include frequency doubled argon-ion or frequency quadrupled YAG laser beams. The maximum refractive index change by means of this method is about $10^{-3}$, see either of the well known teachings of K. O. Hill, B. Malo, F. Bilodeau, and D. C. Johnson, "Photo-sensitivity in Optical Fibers," *Annu. Rev. Mater. Sci.* 125 (1993); or G. R. Atkins and S. B. Poole, "Photolytic Index Changes in Optical Fibers," *Annu. Rev. Mater. Sci.* p 381 (1993). Moreover, a $10^{-2}$ refractive index change can be achieved via hydrogen loading, see B. Malo, J. Albert, K. O. Hill, F. Bilodeau and D.C. Johnson, "Effective Index Drift From Molecular Hydrogen Diffusion in Hydrogen-loaded Optical Fibers and Its Effect on Bragg Grating Fabrication," *Electronics Letters.* vol. 30, pp.442–443 (1994).

Figure 1:
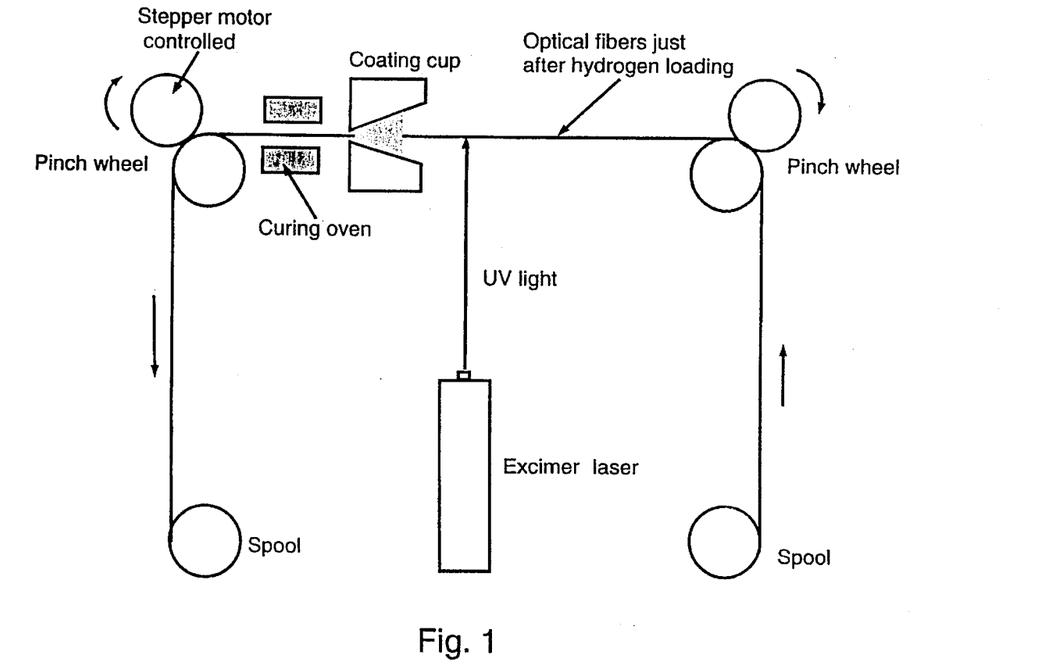
FIG. 1 shows the method for making the continuously varying core refractive index of the optical modal filter.
Figure 2:
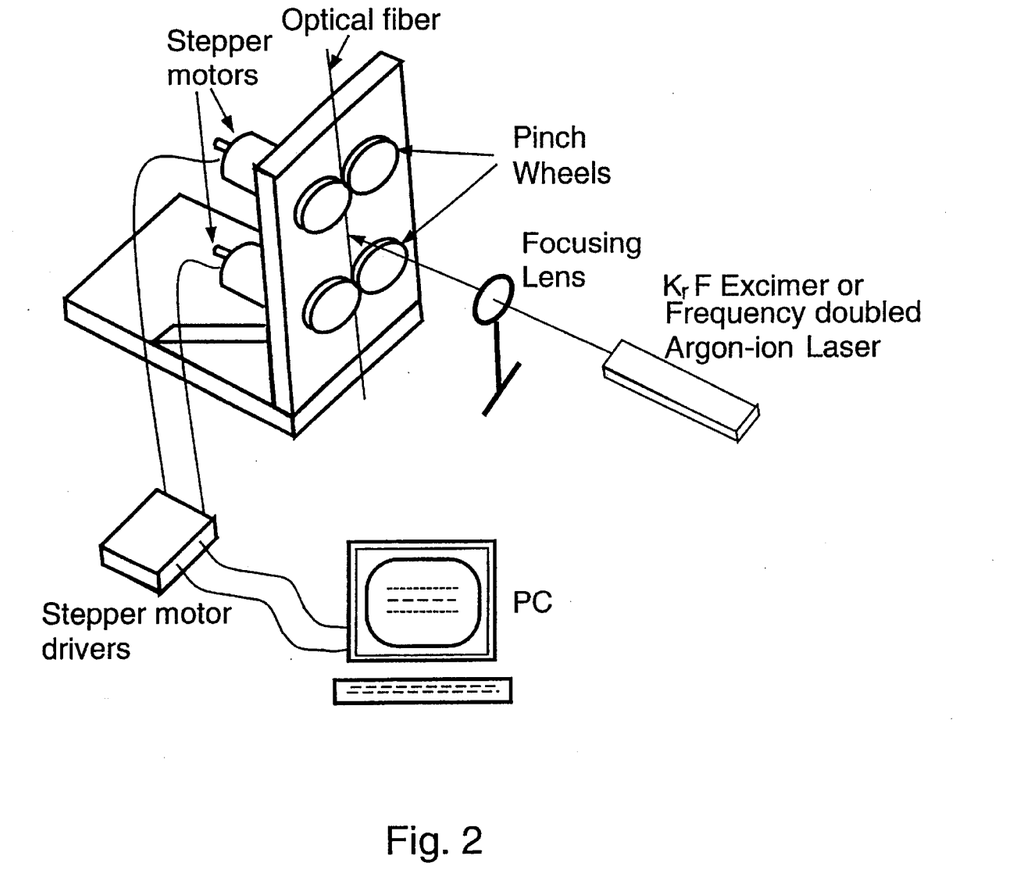
FIG. 2 shows a schematic of the pinch-wheel apparatus for making the vibration modal optical fiber which is fed through the UV exposure region via pinch-wheels driven by high resolution stepper motors.

The apparatus used for making the filtering sensor is shown in FIG. 1 with a high energy (400 mJ) excimer UV laser beam with a wavelength of 248 nm that is focused onto the core of a germanium-doped high-birefringent optical fiber. Other laser types that can be used include frequency doubled argon-ion or frequency quadrupled YAG laser beams. The optical fiber is fed through the UV exposure region via pinch-wheels that are driven by two computer controlled, high resolution stepper motors as illustrated in FIG. 2. The maximum resolution of the stepper motors is 51,200 steps per revolution. The fiber can be modified continuously by using servo motors. Stepper motors provide stepwise control on the order of 200 μm. In designs requiring large refractive index changes, hydrogen loading prior to exposing the fiber to the UV light, see B. Malo, supra. The coating cup and curing oven shown in FIG. 1 can be used to recoat the fiber if necessary. Alternatively, the coating procedure can be done after the weighted fiber is fabricated.

An open loop control system for making the filtering sensor with arbitrary weighting functions can be used that is capable of producing arbitrary spatial weighting functions. There is a relationship between the illuminating time, the illumination energy, and the refractive index change as discussed above by the methods shown in FIGS. 3 & 4. to determine the illumination relationship for a particular fiber and UV source to be used.

Figure 5:
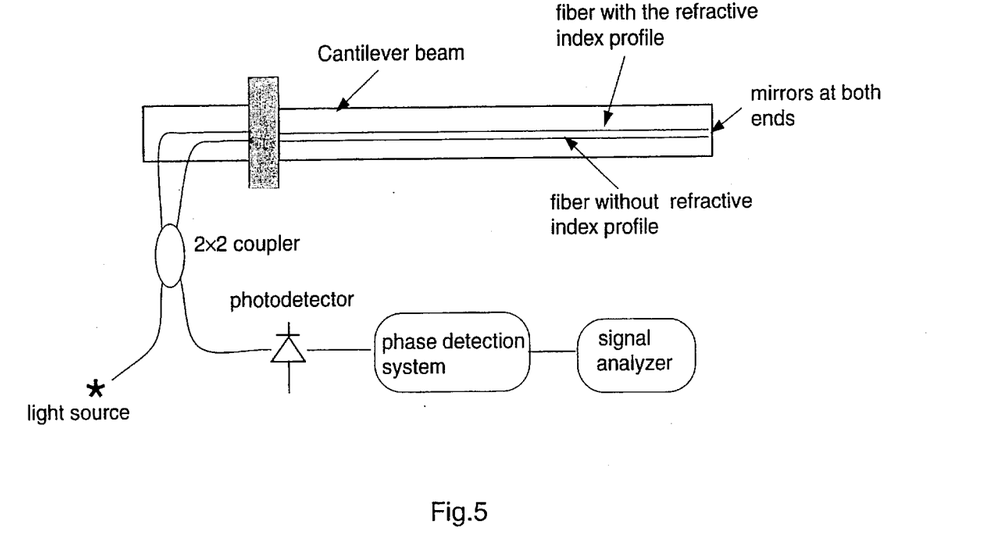
FIG. 5 shows an application of the filtering sensor on a cantilever beam structure.
Figure 6A:
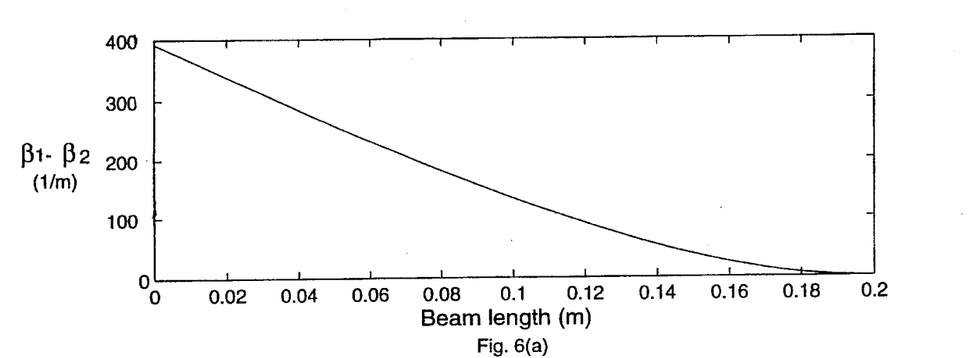
FIG. 6(a) shows a graph of the change of the propagation constant $\Delta\beta$ in the fiber of the filtering sensor as shown in FIG. 5 with respect to length along the beam.
Figure 6B:
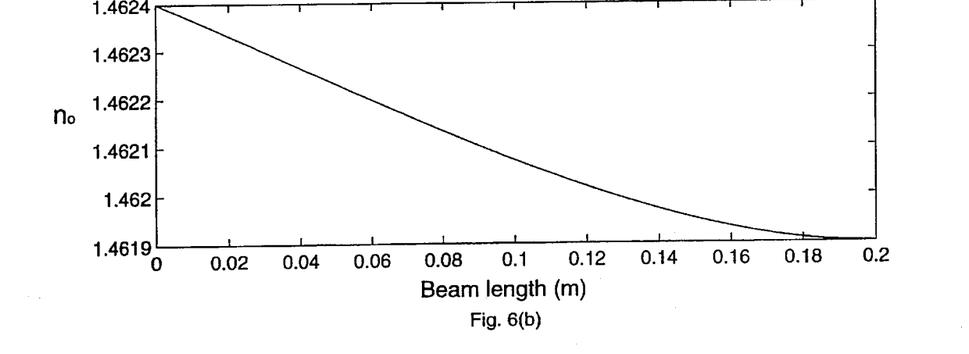
FIG. 6(b) shows a graph of the refractive index profile for retaining the first mode of a cantilever beam in the sensor output as shown in FIG. 5 with respect to length along the beam.
Figure 7A:
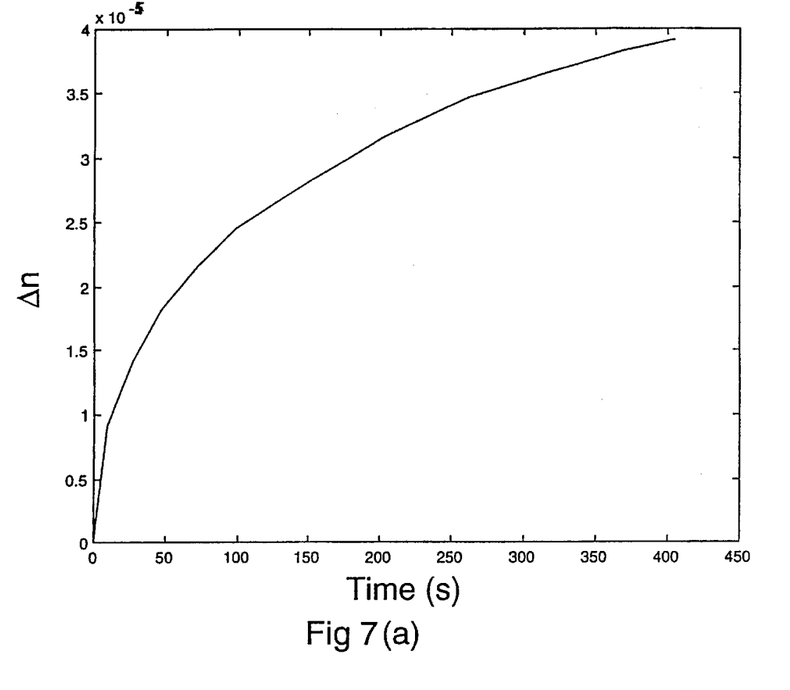
FIG. 7(a) shows a relationship between the refractive index change and the illuminating time from test data by the methods used in FIGS. 3 & 4.
Figure 7B:
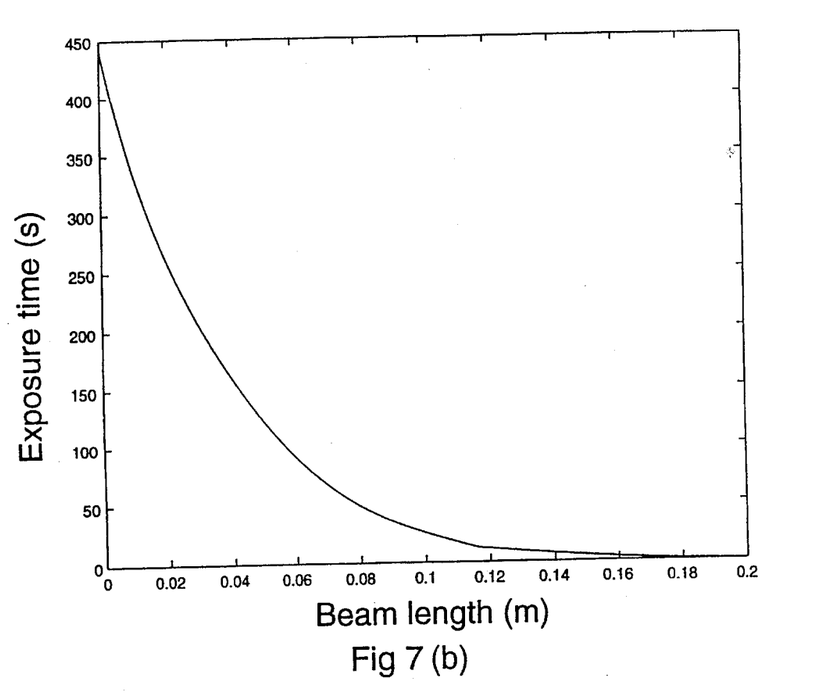
FIG. 7(b) shows the exposure time profile along the fiber length.
Figure 8:
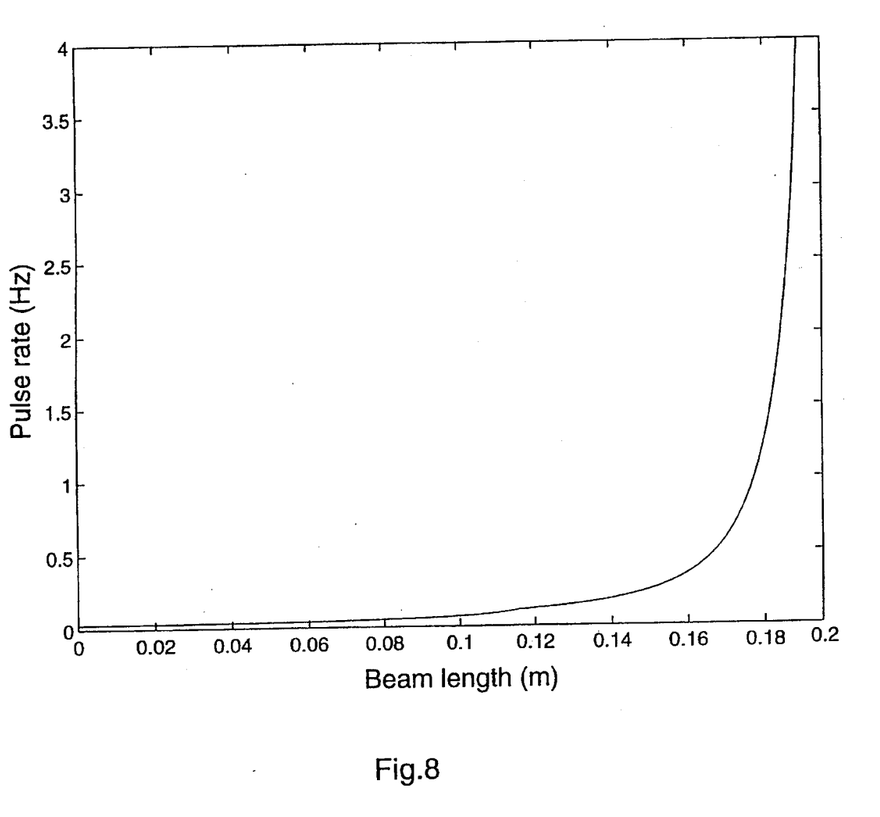
FIG. 8 shows the expected pulse rate profile of a stepper motor.

An example of the fiber-optic modal filtering sensor is shown in FIG. 5. It is a Michelson or parallel polarimetric filtering sensor. In this configuration, the sensing and reference fibers are attached on the surface of a structure, e.g. a cantilever beam as shown. Each fiber experiences similar strain fields, thus, the weighting function is $\beta_1-\beta_2$, where $\beta_1$ and $\beta_2$ are the propagation constants of the sensing and reference fibers respectively. With this configuration, there is no restriction on the weighting function where the initial $\beta_1$ and $\beta_2$ can be chosen separately, and then either $\beta_1$ or $\beta_2$ alone or both can be modified by changing the refractive index of the core to fit any kind of function. Other sensor configuration designs can use two-mode, elliptical core or high-birefringent optical fibers, but with a limitation that only partial modal suppression occurs, not total filtering of the uncontrolled mode(s). This is due to such fibers having initial $\beta_1$ and $\beta_2$ cannot be varied independently which means that $\beta_1$ and $\beta_2$ are changing simultaneously when the fiber's core refractive index is changed along the fiber's length this means that $\beta_1-\beta_2$ can never be zero, which often is required for a modal filter. For example, the propagation constant and refractive index profiles are shown in FIGS. 6(a) & 6(b) for the configuration shown in FIG. 5 where first mode information is sensed and retained. The structure is a 20 cm long aluminum cantilever beam. The fiber has a maximum refractive index change of $5 \times 10^{-4}$. The relationship between the refractive index change and the illuminating time from either method shown in FIGS. 3 & 4 above is shown in FIG. 7 (a) which is used to determine the profile of the illuminating time along the optical fiber length to achieve a modal filter sensor to retain the first mode of this cantilever beam. The illumination time profile is shown in FIG. 7(b). The pulse rate profile for the stepper motors (FIG. 2) is shown in FIG. 8 that is used to drive the stepper motors to produce a time profile in FIG. 7(b). The stepper motor pulse rate curve as shown in FIG. 8 is determined and a processor with either an open-loop or closed-loop control scheme is used to control the rotation velocity of the stepper motors which in turn controls the translation speed of the fiber past the focused UV illumination. In an open-loop scheme, a predetermined expected refractive index profile is obtained from the characteristics obtained by the methods as shown in FIGS. 3 & 4, and then use the Δn-time curve similar to that shown in FIG. 7(a) to set the pulse rate profile of the stepper motor, and then obtain the expected refractive index profile. In a closed-loop scheme, a feedback loop is added to control the stepper motor speed to accurately follow that expected by the pulse rate profile.

Figure 9:
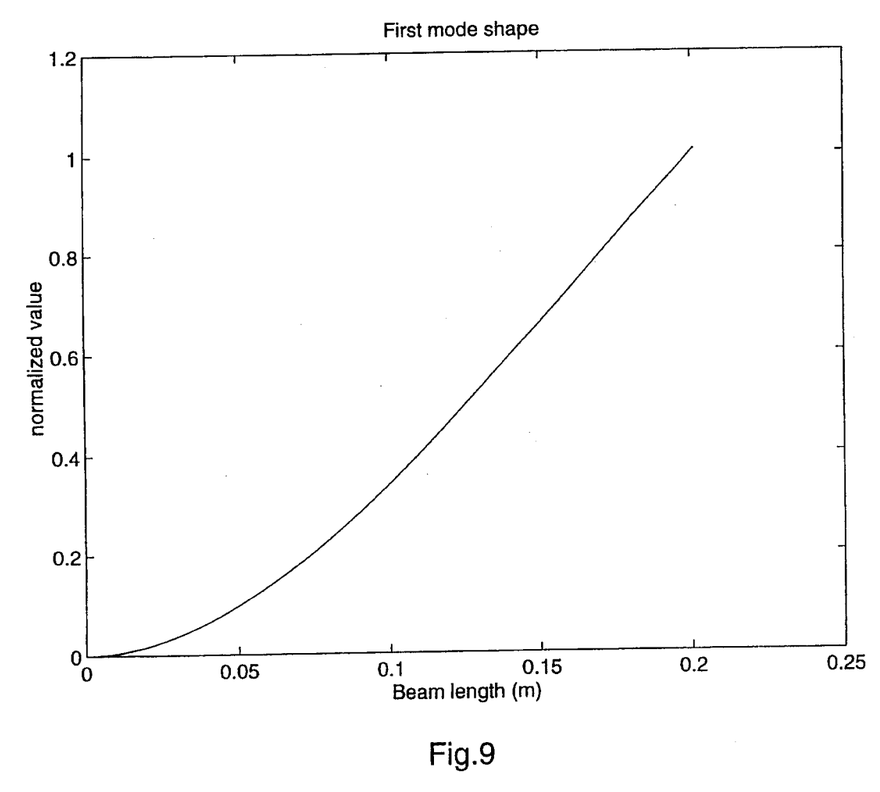
FIG. 9 shows the first mode shape of a cantilever beam.

The process to fabricate vibration modal filtering sensors is as follows:

1. Perform a vibration analysis of the structure to which the sensor will be attached. Determine a theoretical or numerical representation of the mode shape that is targeted for retention. An example of a possible scenario is the selection of the first mode shape of a cantilever beam shown in FIG. 5. The first mode shape is shown in FIG. 9. The equation of this mode shape is expressed by:

$$Y_1(x) = \chi\{\cosh(\Lambda_1 x) - \cos(\Lambda_1 x) - k_1[\sinh(\Lambda_1 x) - \sin(\Lambda_1 x)]\};$$

where $$k_1 = \frac{\cosh(\Lambda_1 L) + \cos(\Lambda_1 L)}{\sinh(\Lambda_1 L) + \sin(\Lambda_1 L)} \; ; \Lambda_1 L = 1.875; \quad (7)$$

and χ is a constant.

2. Choose the type of optical arrangement that will be used to fabricate the sensor. The options include Michelson, Mach-Zehnder, Fabry-Perot, dual-mode, polarimetric configurations or other sensor configurations. The choice of sensor will influence some of the details of sensor intended use and fabrication. One possible example is the use of the Michelson sensor shown in FIG. 5.

3. Select the optical fiber that will be used to fabricate the sensor. Michelson, Fabry-Perot, Mach-Zehnder and other dual beam interferometric sensors can be fabricated in standard circular core single mode fiber or in high-birefringent fiber. Polarimetric sensors are fabricated in high-birefringent fibers. Dual-mode sensors are fabricated using elliptical core fibers. Each fiber type has different photorefractive properties, as do similar classes of fibers from different manufacturers. An example of fiber choice would be to select circular core optical fiber for use with the Michelson sensor shown in FIG. 5.

4. Optionally hydrogen load the fiber by subjecting it to a pressurized hydrogen atmosphere (20 atm to 700 atm) at temperatures between 20° C. and 75° C. for several days. The exact pressure, temperature and time are tailored to achieve maximum photorefraction from the selected fiber.

5. Determine experimentally the relationship between exposure time and refractive index change in the core of the selected optical fiber. This relationship is determined by exposing a segment of optical fiber to a source of known optical power (excimer laser, frequency doubled argon ion laser, frequency quadrupled YAG laser, or other similar sources) for a fixed exposure time following the Fabry-Perot method FIG. 3 or the Bragg grating method shown in FIG. 4. The Fabry-Perot and the Bragg grating methods experimentally determine the change in core refractive index as a result of exposure to UV light. This process is repeated for progressive longer exposure times until a complete relationship between exposure time and $\Delta n$ is obtained.

6. Use the mode shape information of the vibration mode targeted for retention to determine the propagation constant distribution along the fiber length that will retain the targeted vibration mode and suppress all other modes. This propagation constant distribution constitutes the weighting function for the optical fiber sensor that enables the sensor to act as a vibration modal filter. The phase response in a sensor is given by the general equation of equation (1) above where $\Delta\beta(x)$ is the propagation constant distribution which constitutes the weighting function and $\epsilon(x,t)$ is the strain distribution. In the linear vibration structures, such as a cantilever beam, the strain is related to the vibration mode shapes and modal coordinates by: $\epsilon(x,t) = \Sigma Y_{i''}(x)\eta_i(t)$ for i equal to zero to infinity. Substitution of this last equation into equ. (1) above gives:

$$\Delta\phi = \Delta\phi_0 + \sum_0^\infty \eta_i(t) \int_{L^-}^{L^+} \Delta\beta(x) Y_i''(x) dx \quad (8)$$

If weighting function ($\Delta\beta(x)$) is designed into the fiber such that it matches the second derivative of the targeted mode shape, e.g. $Y_i(x)$, due to the orthogonality condition of mode shapes for the cantilever beam in equ. (9), only the information associated with mode i is retained by the sensor.

$$\int_{L^-}^{L^+} Y_i''(x) Y_j''(x) dx = \begin{cases} 1 & i=j \\ 0 & i \neq j \end{cases} \quad (9)$$

For example, if retention of the cantilever with filter's first mode information without any other mode, $\Delta\beta$ is proportional to $Y_{1''}(x)$. The weighting function is obtained by taking the second derivative of equ. (7) and adding a scale factor A.

$$\Delta\beta = \beta_1(x) - \beta_2 = A\Lambda_1^2[\cos(\Lambda_1 x) + \cosh(\Lambda_1 x) - k_1(\sin(\Lambda_1 x) + \sinh(\Lambda_1 x))]; \quad (10)$$

where A is a constant and $\beta_1$ and $\beta_2$ are the propagation constants of sensing and reference fibers respectively with $\beta_2$ constant. This weighting function that corresponds to the Michelson sensor used to retain the first mode in the example of the cantilever beam is plotted in FIG. 6(a).

7. Use the weighting function (propagation constant distribution) with equ. (2) and equ. (3) above to determine the core refractive index profile required to produce the desired weighting function. An example of the refractive index profile that corresponds to the weighting function given by equ. (10) is shown in FIG. 6(b).

8. Use the exposure time versus core refractive index change (time-$\Delta n$ curve) determined in step 5 to determine the exposure time as a function of position along the fiber length required to produce the desired weighting function. An example, showing the exposure time required to produce the weighting function given in equ. (10) for retaining the first mode of the cantilever beam, is shown by FIG. 6(b). This curve is determined by using the refractive index profile in FIG. 6(b) with the time-$\Delta n$ curve similar to that shown in FIG. 7(a).

9. Expose the optical fiber along its length according to the exposure profile determined in step 8. This is done using the apparatus shown in FIG. 2 by directly exposing the fiber core with UV light through the side of the fiber. The apparatus shown in FIG. 2 uses pinch wheels attached to computer controlled stepper motors to guide the optical fiber through the UV laser light. The stepper motor pulse rate, which controls stepper motor angular velocity, is varied so as to expose the fiber according to the time-$\Delta n$ curve determined in step 8. The required stepper motor pulse can be run in open loop or closed loop modes.

Although the description above contains many specificities, these should not be construed as limiting the scope of this invention but as merely providing illustrations of some of the presently preferred embodiments of this invention.

We claim:

1. A sensed structure comprising the structure with an attached uniform cross-sectional non-grating type optical-fiber vibration modal filtering sensor, the sensor is an optical fiber with permanent direct distributed photorefractive induced core changes along the fiber's length in an unstrained state forming a continuously modified light propagation constant distribution, the induced core changes are produced by focusing ultra-violet (UV) laser light in the fiber's core yielding the continuously modified light propagation constant distribution in the fiber's core, the continuously modified light propagation constant distribution is a modulated refractive index profile distribution without a superimposed grating profile distribution satisfying a weighting function of the sensor, the propagation constant distribution along the fiber's length is the weighting function of the sensor, wherein the weighting function is defined by vibration modal analysis of the structure to which the sensor is attached which generates an a priori numerical representation of modal shape information of a selected vibration mode in the structure which corresponds with the sensor's distributed photorefractive induced core changes along the fiber's length, whereby allowing flexibility and ease of use as to i) a selected optical arrangement for fabrication and ii) type of optical fiber used.

2. The structure of claim 1 wherein the optical fiber is a high-birefringent optical fiber.

3. The structure of claim 1 wherein the optical fiber is a elliptical core optical fiber.

4. The structure of claim 1 wherein the optical fiber is a circular core single mode fiber.

5. The structure of claim 1 wherein the optical fiber is hydrogen loaded prior to exposure to the UV laser light allowing $10^{-2}$ refractive index changes in the fiber's core.

6. A method of making a sensed structure using a non-grating type uniform cross-sectional optical fiber modal filtering sensor for attachment to the structure comprising the steps of:

a) determining an optical configuration and type of optical fiber used to fabricate the sensor;

b) determining a relationship of illumination time for a UV laser source with a focusing means upon the optical fiber and a refractive index change of a germanium-doped optical fiber for subsequent control of the illumination time upon the fiber in step d);

c) determining a propagation constant distribution without a superimposed grating profile distribution along the fiber's length which is the sensor's weighting function by performing:
   i) vibration modal analysis of the structure for which the sensor is fabricated, and
   ii) from substep i), a numerical representation of a priori based modal shape information of a vibration mode to be sensed in the structure which corresponds to the propagation constant distribution;

d) illuminating the germanium-doped optical fiber core with the UV laser source;

e) controlling photoreaction within the optical fiber's core in an unstrained state by a processor means for effecting: i) the UV laser source's power and ii) a relative translation speed of the optical fiber past a focal point of the focusing means in accordance with the sensor's propagation constant distribution along the fiber's length determined in step c); and f) attaching the sensor to the structure after completion of step e).

7. The method of claim 6 wherein the optical configuration determined in step a) is a Fabry-Perot configuration.

8. The method of claim 6 wherein the optical configuration determined in step a) is a Bragg grating configuration.

9. The method of claim 6 wherein the optical configuration determined in step a) is a Michelson configuration.

* * * * *